May 11, 1926.
G. D. ANGLE
1,583,949
CAM SHAFT FOR TEST ENGINES
Filed Dec. 30, 1920    2 Sheets-Sheet 1
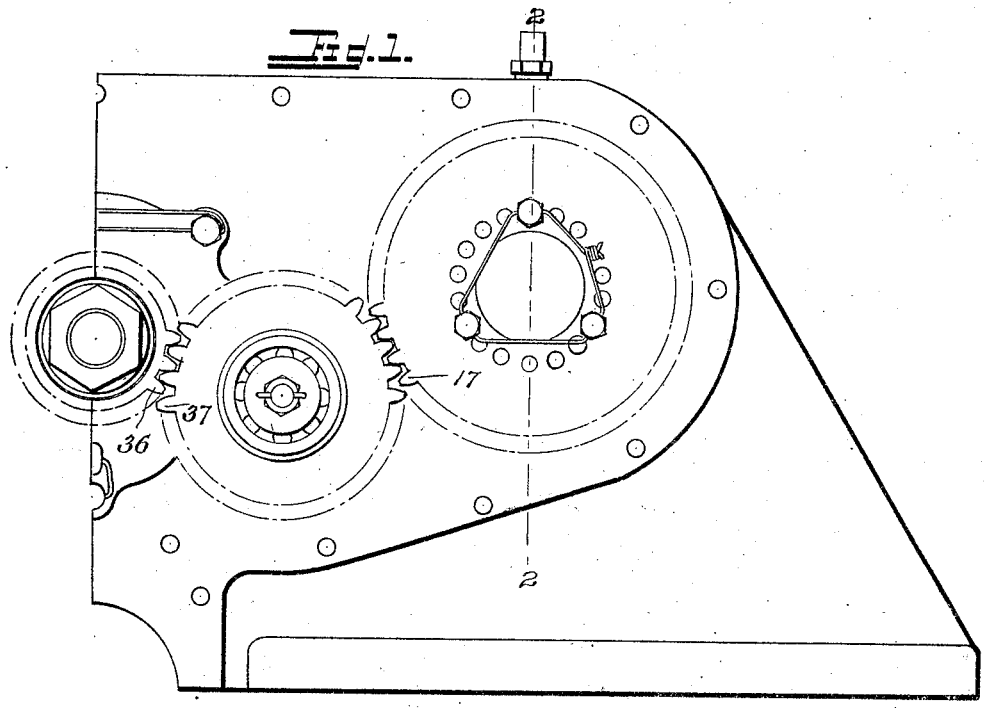
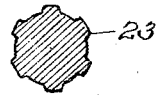
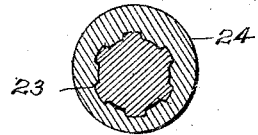
Inventor
Glenn D. Angle
By Robert H. Young
Attorney

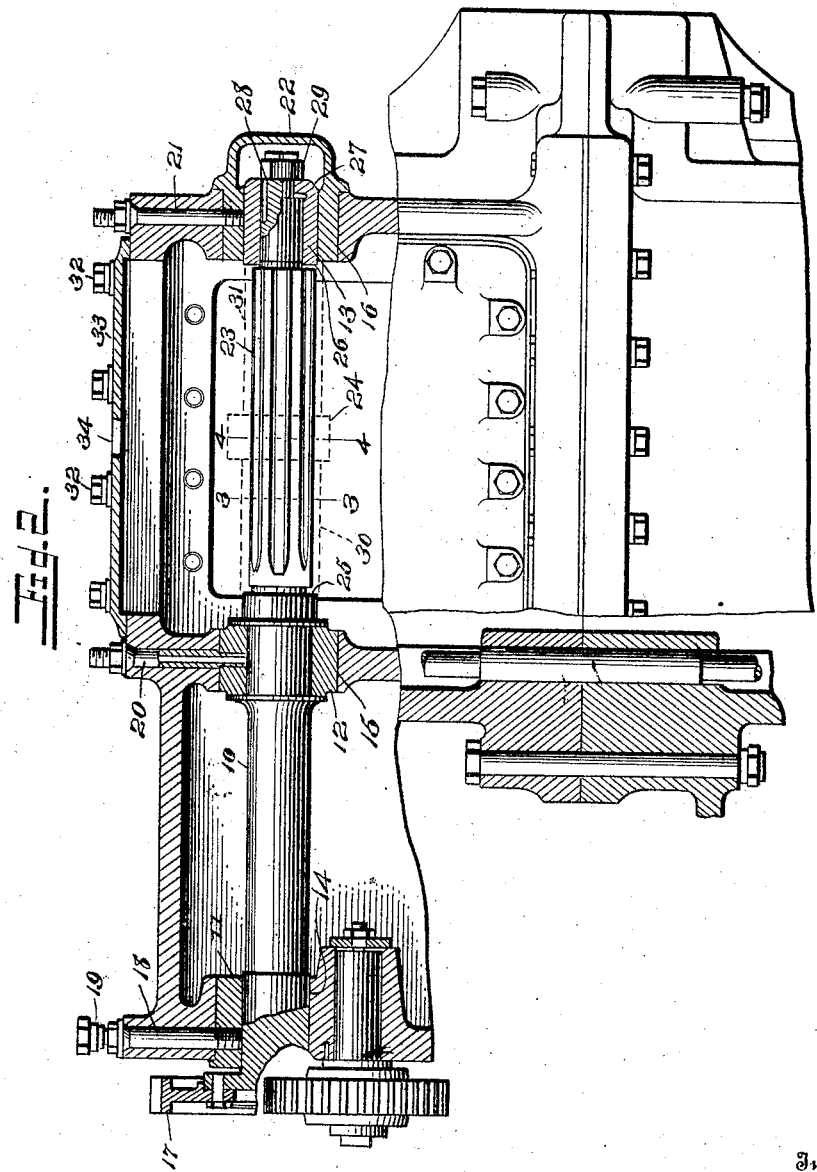

Patented May 11, 1926.

1,583,949

UNITED STATES PATENT OFFICE.

GLENN D. ANGLE, OF DAYTON, OHIO.

CAM SHAFT FOR TEST ENGINES.

Application filed December 30, 1920. Serial No. 434,133.

This invention relates to test engines or in other words engines used for the purpose, for example, of testing engine cylinders of different longitudinal and transverse dimensions, different bores and strokes, and cylinders adapted for high, low and intermediate degrees of compression as well as other conditions incident or peculiar to engine cylinders of different sizes and formations.

The present invention relates particularly to the cam shaft of such test engine, whereby such cam shaft may be removed and replaced quickly and the position of the cam or cams thereon changed in accordance with the location of the push rod or rods. In this connection, the frame of the test engine embodies a removable cover plate and interchangeable cover plates having openings located to accommodate different locations of the push rod or rods together with push rod guides which are carried by such cover plates.

With the above and other objects in view the invention consists in the novel construction, combination and arrangement herein shown, described and claimed.

In the accompanying drawings—

Figure 1 is an end elevation of a portion (one half) of the test engine;

Figure 2 is a vertical longitudinal section on the line 2—2 of Figure 1;

Figure 3 is a vertical cross section on the line 3—3 of Figure 2 taken at one side of the cam;

Figure 4 is a vertical cross section on the line 4—4 of Figure 2, showing the relation of the cam to the cam shaft.

In test engines it is necessary for the purpose of testing cylinders of different sizes and types to provide means whereby the cam mechanism for operating the valve or valves of the cylinder may be properly positioned with respect to the push rods and rocker arms. In order to accomplish this in an expeditious and practical manner the cam shaft designated 10, (there being two of such cam shafts arranged equi-distantly on opposite sides of the main crank shaft,) is mounted in bearings 11, 12 and 13, the latter being in turn mounted in openings 14, 15 and 16 in the engine frame as clearly shown in Figure 2. The bearings 11, 12 and 13 may be of any suitable bearing material, the shaft 10 being seated and journaled in all of said bearings and being provided at one end thereof with a driving gear 17 which is ordinarily keyed or otherwise fastened to the cam shaft and made removable therewith.

The bearing 11 is held in place in the opening 14 by fastening means 18 shown in the form of a lubricating pipe which screws into the bearing 11 and when not in use is closed by means of a screw plug 19 or the equivalent thereof. In like manner the bearing 12 is held in place in the opening 15 by fastening means 20, also in the form of a lubricating pipe or tube. A similar tube 21 is inserted through a portion of the engine frame and threaded into the bearing 13. The bearing 13 is closed at its outer end by a wall 22 so that the bearing 13 also forms a dust cap for the cam shaft.

Between the bearings 12 and 13, the cam shaft 10 is non-circular in cross section as shown at 23. It is preferred to form such portion of the shaft with a plurality of longitudinal parallel splines and the cam shown at 24 has its opening similarly formed so that while it may be slid on and off the cam shaft, when in place thereon it will be driven by and caused to rotate with said cam shaft. In order to hold the cam 24 in place in relation to the cam shaft the latter is formed with annular shoulders 25 and 26, the last named shoulder being illustrated as formed by an enlarged cup shaped section 27 which is slipped over the end of the shaft and fastened thereto by a key 28, the parts being secured by a nut 29 threaded on a reduced extension of the cam shaft 10 which passes through the end wall of the section 27. Spacing sleeves 30 and 31 which ordinarily have a smooth bore are slipped over the splined portion of the shaft between the shoulders 25 and 26 and between said shoulders and the opposite faces of the cam 24. A number of interchangeable sleeves 30 and 31 of different lengths are provided in order to expeditiously change the position of the cam 24 on its shaft.

Above the splined portion of the cam shaft 10 the engine frame has secured thereto by fastening means 32 a cover plate 33 having an opening 34 for the passage of the usual push rod (not shown) and said cover plate will ordinarily be provided with a suitable push rod guide. It is to be understood that any number of interchangeable cover plates 33 may be employed having holes 34 and push rod guides located at different points to accommodate the several possible locations of the push rod or rods.

In order to change the position of the cam 24 or substitute a cam of different size or shape, the shaft 10 is removed by loosening the tube 21 and by withdrawing the tubes 18 and 20 sufficiently to enable the bearings 11 and 12 to be removed with the cam shaft. The bearing 13 may be left in the place shown in the drawings. The bearing 13 is ordinarily continuous or, in other words, it is not split, while the other bearings 11 and 12 are of the split type so that they may be readily applied to and removed from the cam shaft. After the cam shaft has been removed from the engine frame, the detachable section 27 may be removed from the cam shaft in order to enable the cam 24 and spacing sleeves 30 and 31 to be detached. Another cam and spacing sleeves of suitable lengths may then be substituted and secured upon the cam shaft, the cam shaft being then replaced in position and secured by reversing the order of the operation hereinabove described. The cam shafts of the engine are illustrated as being driven by suitable gears 36 and 37 from the crank shaft. The tubes 18, 20 and 21 are designed to be connected with an oil manifold. When the latter is not used, said tubes may be plugged.

I claim:

1. An engine for testing interchangeable engine cylinders, comprising a crank case, a cam shaft removable by an endwise movement thereof from the crank case, and cam shaft bearings in which the cam shaft is journaled, said bearings being also removable with the cam shaft in such endwise movement, a cam slidable on and off said cam shaft when removed from the crank case, and means to prevent rotational movement of said cam about its shaft.

2. In a testing engine, a cam shaft and cam shaft bearings removable from and replaceable in the engine crank case by an endwise movement of said shaft, a cam slidable on and off said shaft by movement longitudinally of the shaft, and means for holding said cam and cam shaft bearings in properly assembled relation to each other and said shaft.

3. In a testing engine, a cam shaft and cam shaft bearings removable from and replaceable in the engine crank case by an endwise movement of said shaft, a cam slidable on and off said shaft by movement longitudinally of the shaft, and spacing members on said shaft between the cam and cam shaft bearings.

In testimony whereof I have affixed my signature.

GLENN D. ANGLE.